Oct. 21, 1924.
G. W. GRAY
1,512,419
MANUFACTURE OF ALUMINUM CHLORIDE
Filed Nov. 23, 1921
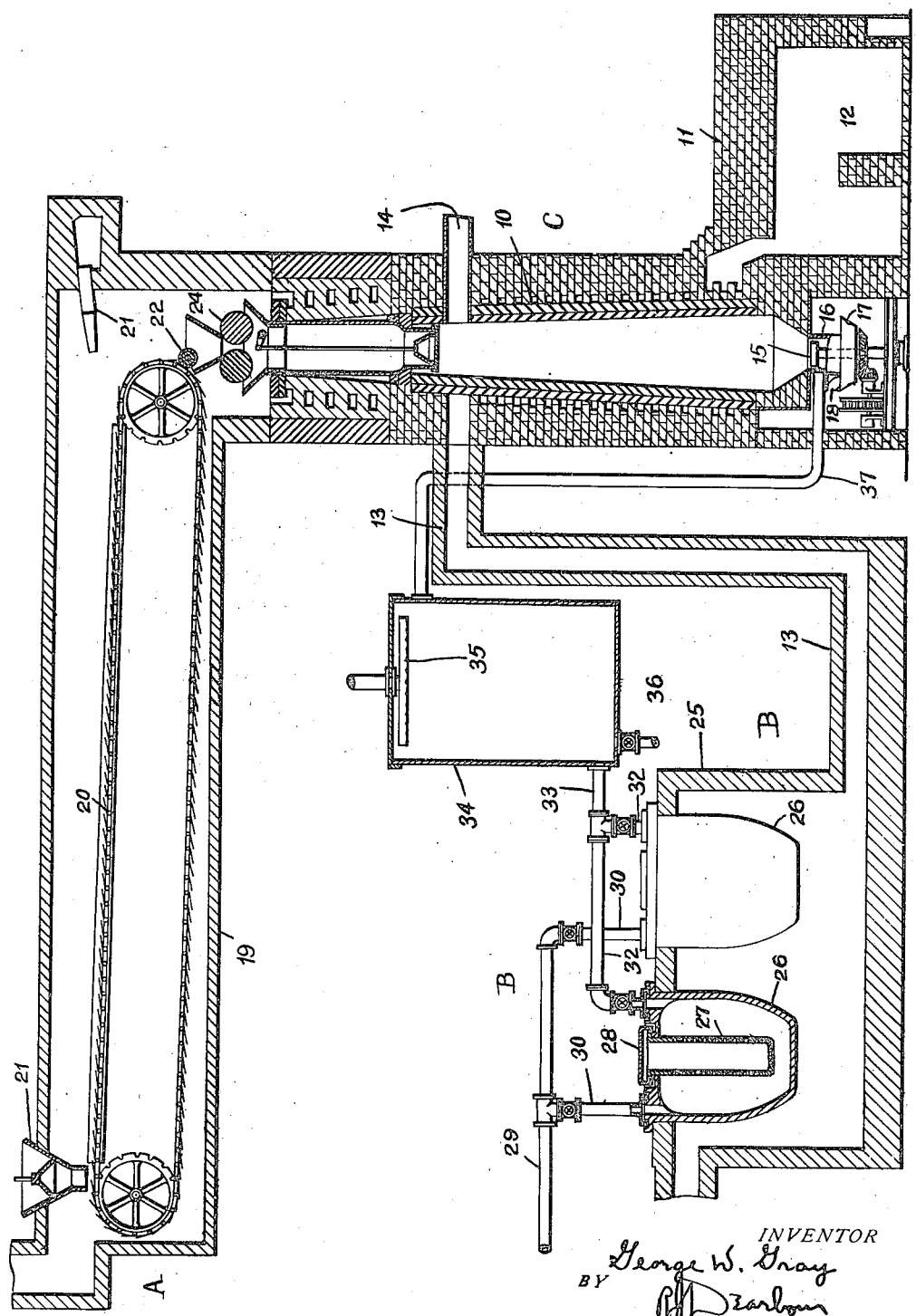
INVENTOR
George W. Gray
BY
R. J. Dearborn
ATTORNEY Patented Oct. 21, 1924.

1,512,419

UNITED STATES PATENT OFFICE.

GEORGE W. GRAY, OF NEW YORK, N. Y., ASSIGNOR TO THE TEXAS COMPANY, OF NEW YORK, N. Y., A CORPORATION OF TEXAS.

MANUFACTURE OF ALUMINUM CHLORIDE.

Application filed November 23, 1921. Serial No. 517,162.

*To all whom it may concern:*

Be it known that I, GEORGE W. GRAY, a citizen of the United States of America, and a resident of New York, county and State of New York, have invented certain new and useful Improvements in the Manufacture of Aluminum Chloride, of which the following is a specification, reference being had to the accompanying drawings, forming a part thereof.

This invention relates to the production of anhydrous aluminum chloride and has special reference to a process and apparatus adapted for the continuous production of aluminum chloride in relatively large quantities.

In accordance with my invention, the materials employed in the reaction for the production of the chloride are prepared in situ and are continuously introduced into the main reaction chamber preferably in a preheated condition so that in the practice of the invention the advantages of economy in fuel as well as the continuity of operation are effected.

One phase of the invention includes the utilization of the waste heat from the main reaction chamber for supplying the heat required in the preliminary reactions and in preparing materials for the main reaction. The invention is adapted to be used in connection with various reactions for the production of aluminum chloride. It is particularly applicable however, to that method of operation in which an aluminous substance and a reducing agent are reacted with chlorin or other chlorinating agents for the production of aluminum chloride, and in the following detailed description of the invention reference is specifically made to that particular reaction.

I will now proceed to give a detailed description of the invention, reference being had to the single figure of the accompanying drawings which is a sectional elevation of an apparatus constructed in accordance with my invention and constituting an embodiment thereof.

The apparatus comprises in general, a coking oven A, a chlorin generating apparatus B, and a main reaction apparatus C.

The apparatus C is adapted for carrying on the main reaction for the production of the aluminum chloride and includes a retort 10 of suitable refractory material, arranged within a furnace 11 having a combustion chamber 12 by which hot gases are supplied to the tortuous passage formed by the checkered brick work about the retort. The spent gases leave the furnace by means of a flue 13.

The aluminum chloride vapors generated in the retort are conducted through a vapor line 14 to a suitable condenser and receiver. The materials for the reaction are supported in the retort by means of a grate 15 which permits the spent material to pass out through an outlet or extension 16 into a pan 17. The pan is preferably arranged to be rotated in any suitable manner and a plow 18 is provided which is arranged to scrape the material in the pan to a predetermined depth so that the excess ash may be continuously discharged from the pan, there being, however, sufficient ash remaining to form a seal preventing either the ingress or egress of vapors to or from the retort.

It is generally desirable to coke the alumina-carbon mixture before introducing it into the retort and to perform this process continuously the coking and preheating mechanism A is provided. This apparatus consists of a flue or chamber 19 in which is mounted a conveyor 20 adapted to receive material from a hopper 21 at one end of the chamber and to deliver the material after it has been coked to the other end of the chamber. Hot gases derived from any suitable source may be supplied to the conveyor by means of a nozzle or discharge pipe 21. If desired, the outlet pipe 21 may be in communication with the flue 13 so as to carry waste gases from the furnace 11 to the oven 19.

The coked product may be removed from the conveyor by any convenient means such as a scraping mechanism 22 and the product discharged into a hopper 23 after having been passed through rollers or crushers 24, if necessary. The hopper 23 is so positioned that it may receive heat from either or both the furnace 11 and the oven 19 so that the coked product may be delivered into the retort 10 in a heated condition.

The chlorin producing apparatus B comprises a heating chamber 25 which is supplied with hot gases from the furnace 11 by means of the flue 13. A plurality of stills or reaction vessels 26 are mounted within the heating chamber. It is desirable to have more than one reaction chamber so that chlorin gas may be continuously generated and supplied to the retort 10 without interruption.

The apparatus illustrated is adapted for the production of chlorin by means of the reaction obtaining between hydrochloric acid and manganese. Each reaction chamber is provided with a cylinder 27 depending into the chamber and adapted to be charged with manganese through a charging trap door 28. The hydrochloric acid is supplied by pipe 29 having a plurality of valve branches 30 which extend to the respective reaction chambers. The chlorin gas generated flows through the valved outlet lines 32 and 33, by which the gas is delivered to a drying tower 34. The tower contains contact material and is supplied with sulphuric acid by means of a spray 35. The acid is drawn off by a pipe 36 and the dried chlorin gas enters a pipe 37 by which it is delivered to the retort 10.

In carrying on the process the alumina-containing material after having been preheated and coked in the oven 19 is supplied as may be desired to the retort 10 while the hot dry chlorin gas delivered from the chlorin producer is continuously passed into the retort. The furnace 11 is so fired that sufficient heat for the reaction may be imparted to the retort and the spent gases are delivered to the reaction vessels 26 thereby supplying the heat necessary for generating the chlorin gas. If desired, hot gases may also be drawn from the flue 13 to supply the heat necessary in the coking operation so that the preheating and coking of the alumina-containing material as well as the production of the chlorin for the main reaction is carried on by means of waste heat derived from the chlorinating step.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

1. In apparatus for the manufacture of aluminum chloride the combination of an aluminum chloride retort, a furnace for supplying high temperature heat thereto, a chlorin producer arranged to discharge into the retort, and means for supplying lower temperature heat from said furnace to the chlorin producer.

2. In apparatus for the manufacture of aluminum chloride the combination of an aluminum chloride retort, a furnace for supplying high temperature heat thereto, a chlorin producer arranged to discharge into the retort, an oven and conveyor for preparing solid material for the retort and discharging it therein, and means for supplying lower temperature heat from the retort to the chlorine producer.

3. In apparatus for the manufacture of aluminum chloride the combination of an aluminum chloride retort, a furnace for supplying high temperature heat thereto, a chlorin producer arranged to discharge into the retort, an oven, a conveyor contained in said oven and adapted to transmit through the oven solid material to be coked, means for transferring the coked product from the oven to the retort, and means for supplying lower temperature heat from the retort to the producer and to the oven.

4. The process of making aluminum chloride which comprises maintaining alumina-carbon materials in a retort, generating hot gases and applying them at a high temperature to the retort to heat the contents thereof, withdrawing gases used in thus heating the retort and applying them at a lower temperature to a chlorin generating apparatus, introducing materials into said apparatus for reaction to form chlorin gas and conducting said chlorin gas to said retort.

5. The process of making aluminum chloride which comprises generating hot gases and applying them to a retort to heat same, withdrawing a portion of the spent gases used in thus heating the retort and applying them to an oven, passing alumina-carbon material through said oven so that said material is coked by the heat of said gases, introducing the coked product into the retort, withdrawing another portion of the spent gases and applying them to a chlorin generating apparatus to heat same, admitting into said apparatus materials adapted to react to produce chlorin and conducting said chlorin into said retort.

In witness whereof I have hereunto set my hand this 15th day of November, 1921.

GEORGE W. GRAY.